C. DURNING.
AUTOMOBILE REAR SIGNAL.
APPLICATION FILED JUNE 6, 1919.

1,356,814.

Patented Oct. 26, 1920.
3 SHEETS—SHEET 1.

Inventor
Charles Durning

By W.W.Williamson
Atty.

C. DURNING.
AUTOMOBILE REAR SIGNAL.
APPLICATION FILED JUNE 6, 1919.

1,356,814.

Patented Oct. 26, 1920.
3 SHEETS—SHEET 2.

Inventor
Charles Durning
By N.W.Williamson
Atty.

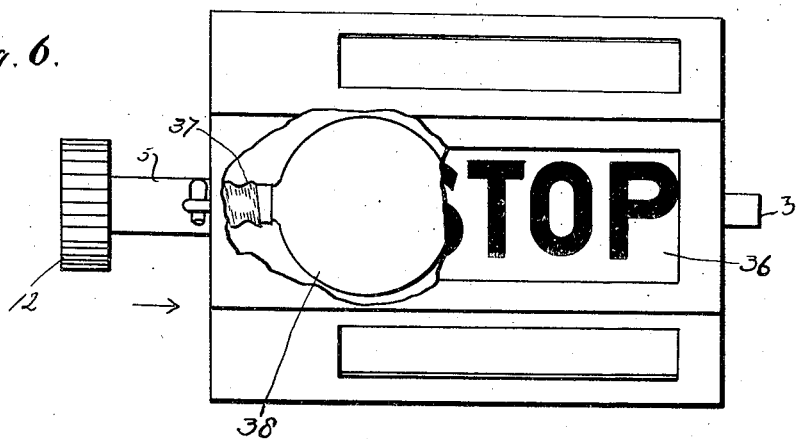
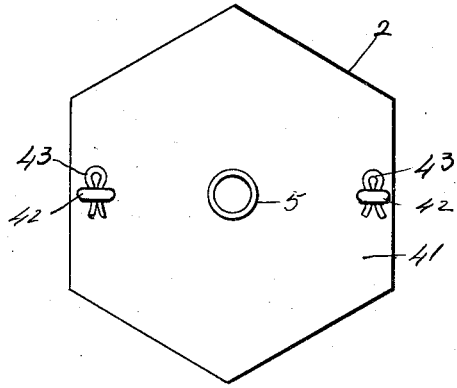
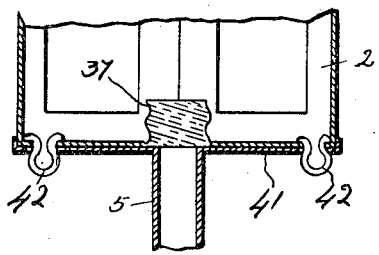

UNITED STATES PATENT OFFICE.

CHARLES DURNING, OF PHILADELPHIA, PENNSYLVANIA.

AUTOMOBILE REAR SIGNAL.

1,356,814. Specification of Letters Patent. Patented Oct. 26, 1920.

Application filed June 6, 1919. Serial No. 302,096.

*To all whom it may concern:*

Be it known that I, CHARLES DURNING, a citizen of the United States, residing at Philadelphia, in the county of Philadelphia and State of Pennsylvania, have invented new and useful Improvements in Automobile Rear Signals, of which the following is a specification.

My invention relates to a new and useful improvement in automobile rear signals and license tag holders and illuminators, which are used by the operators of automobiles to signal following vehicles of their intentions to stop, start, slow down or turn to the right or left, by simply setting a hand relative to a dial and has for its object to provide in such a device, simple and effective means for mounting the shaft ends of a rotatable signal drum.

With these ends in view, my invention consists in the details of construction and combination of elements hereinafter set forth and then specifically designated by the claims.

In order that those skilled in the art to which this invention appertains may understand how to make and use the same I will describe its construction in detail, referring by numerals to the accompanying drawings forming a part of my application, in which:—

Fig. 6, is an enlarged detail view of the signal drum partly broken away to show the arrangement of the electric lamp therein.

Fig. 7, is an end view of the drum looking in the direction of the arrow, the gear being removed, and Fig. 8, is a partial central section of Fig. 7 showing the lamp socket and the method of securing the head of the drum thereon.

Figure 1:
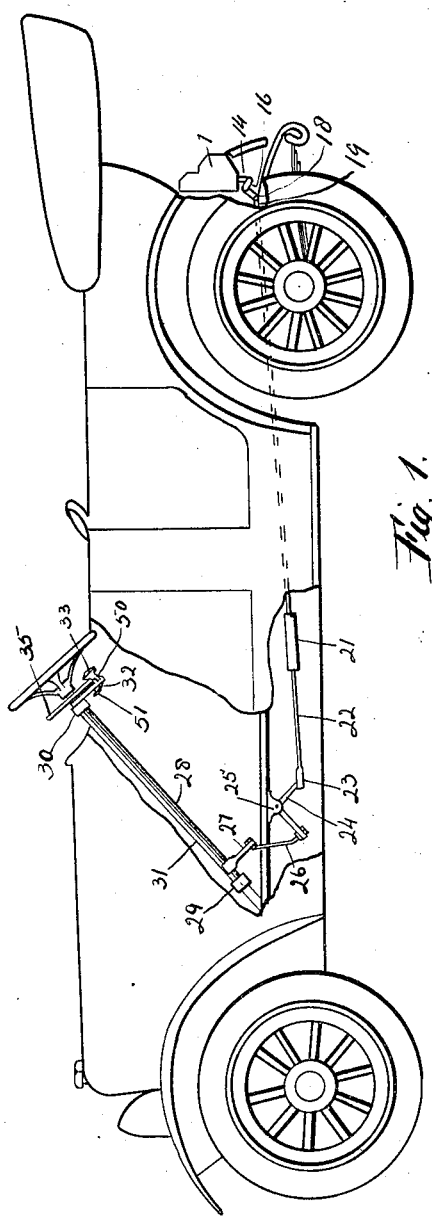
Figure 1, is an elevation of an automobile showing my improvements applied thereto, a portion of the body of the machine being broken away.
Figure 2:
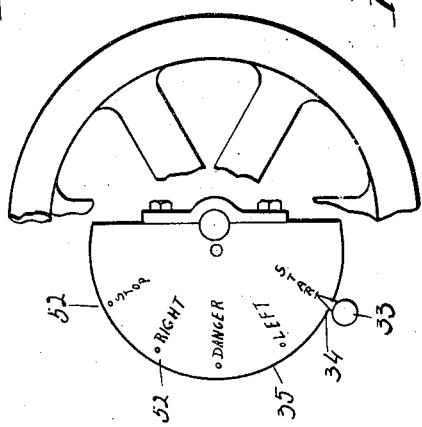
Fig. 2, is an enlarged plan view of a portion of the steering wheel showing the indicating dial attached to the steering post casing.
Figure 3:
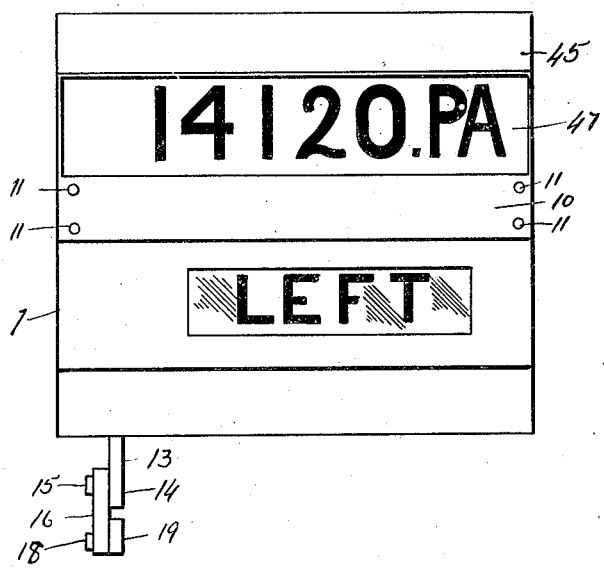
Fig. 3, is an enlarged rear elevation of the indicator detached from the machine.
Figure 4:
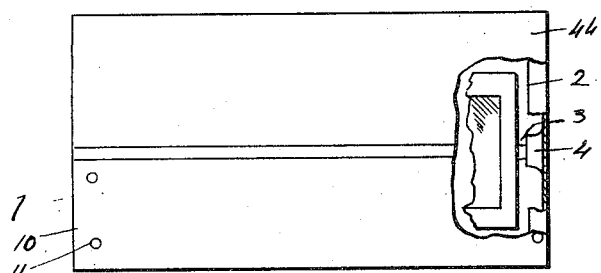
Fig. 4, is a plan view of Fig. 3, partly broken away to show the signal drum therein.
Figure 5:
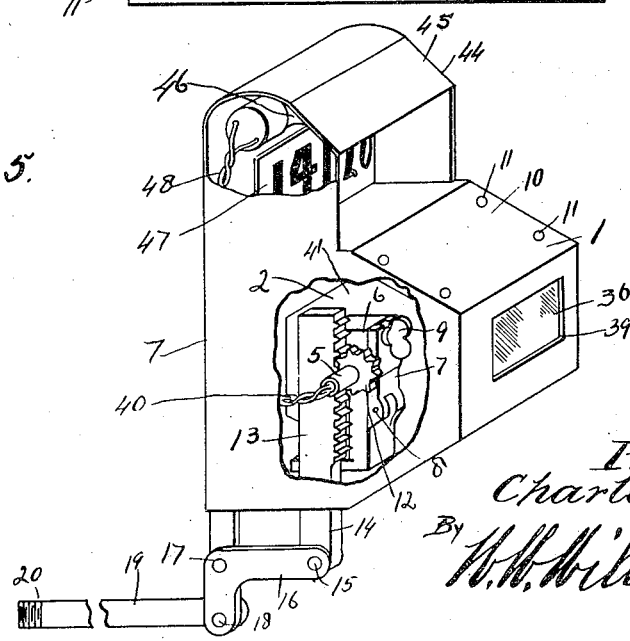
Fig. 5, is a perspective of the signal, the casing being partly broken away to show the arrangement of certain of the parts therein.

In carrying out my invention as here embodied 1 represents the casing which is of the proper shape and size to contain the signaling drum, the mechanism for operating the same, the license tag and the lamp for illuminating the same. Within this casing is mounted the signaling drum 2, which is of polygon cross section here shown as having six sides, which may have as many sides as are necessary to provide for the desired number of signals.

The mounting of this drum is here shown as being accomplished as by a short shaft 3 projecting from one end thereof into a bearing 4 at one side of the casing while the other end of the drum is provided with a short hollow shaft 5 mounted in the bearing 6 the latter having a cap 7 which is hinged at 8 and secured in this closed position by the thumb nut 9 so that this cap may be swung open for the ready removal of the short shaft from its bearing, which will permit the removal of the drum from the casing when occasion requires; the top 10 of the casing being made removable by the use of the screws 11 for that purpose. Upon the short shaft is secured the gear 12 with which meshes the teeth of the rack bar 13 slidably mounted in the casing so as to have a vertical movement for revolving the gear. The shank 14 of this rack bar projects through the bottom of the casing and is pivoted at 15 to one arm of the bell crank lever 16 which latter is pivoted at 17 and has pivoted at 18 to its other arm the rod 19.

The outer end of the rod 19 is threaded as indicated at 20 for the reception of one end of the turn buckle 21 into the opposite end of which is threaded the rod 22 which latter is pivoted at 23 to the bell crank lever 24, said bell crank lever being pivoted at 25 to a suitable bracket secured to the automobile having connected to its opposite end the swivel rod 26 which in turn is swiveled to the crank arm 27. This crank arm 27 is secured to the operating rod 28 which latter is journaled in the bearings 29 and 30 secured to the steering post casing 31.

32 represents an operating arm which is secured to or formed with the upper end of the operating rod 28 and carries the handle 33 for manipulation by the driver of the machine and also carries a pointer 34 adapted to travel over the indicator or dial 35. This dial is divided into graduations and has thereon such words as correspond with the signal words upon the signaling drum such as stop, right, danger, left and start.

The signaling drum 2 has openings in the sides thereof which are covered by panes of glass 36 or other transparent or translucent material on which appear the signaling words in colors which are well recognized to correspond with the particular signals 1 and the panes may be of such colors the lettering of the words being clear or entirely transparent, the idea being to not only indicate the particular signal by the word, but also by the color either of the lettering or of the back ground of the lettering; as for instance lettering of the signal danger would either appear with red or the back ground thereof would appear in red. Where found desirable celluloid may be used instead of glass or any other convenient material or arrangement for producing this result.

Coinciding with the inner end of the short hollow shaft 5 is a lamp socket 37 for the reception of an electric lamp 38 for illuminating the interior of the drum so as to make each of the signals highly visible from the rear of the machine when said signal is set in front of the opening 39 in the back of the casing.

40 represents the feed cord for conveying the electric current to and from the lamp and this cord passes through the hollow shaft to the socket 37.

From the foregoing description it will be seen that when a driver of an automobile desires to signal vehicles following of his intention to stop, start or turn in either direction it is only necessary for him to turn the pointer 34 to the proper designation upon the dial which movement will actuate the rack bar 13 in such manner as to turn the drum so as to bring the corresponding signal in front of the opening 39 and as this operation is so easily performed the dial being in such convenient position to the driver the chance of accidents will be brought to a minimum.

In order that easy access may be had to the interior of the drum the head 41 of this drum is secured thereon by the eyes 42 projecting through slots therein, and these eyes are adapted to receive the cotter pins 43 which securely hold this head in place to permit of its easy removal for renewing the lamp for other purposes.

44 represents a hood which is formed with or secured upon the casing 1 having a reflector 45 forming a portion of its top and set at such an angle as to throw the light from the lamp 46 onto the license tag 47 and so intensify this light as to make the tag highly legible from the rear of the machine. The lamp 46 is located lengthwise in the hood and is fed by the wires of the cord 48.

By housing in the license tag and leaving only a rear opening in the hood for this observation in the rear it is protected from the elements and against being splashed with mud which ofttimes makes it entirely illegible.

I prefer that the handle 33 be pivoted at 50 to the operating arm and be provided with a latch 51 adapted to enter the holes 52 formed in the dial in order that when the pointer is brought to the desired indication it may be locked in this position by the point of the latch entering the corresponding hole 52.

Of course I do not wish to be limited to the exact details of construction as herein shown as these may be varied within the limits of the appended claim without departing from the spirit of my invention.

Having thus fully described my invention, what I claim as new and useful is:—

In a device of the character stated, a casing for housing a removable rotatable signal drum provided with short shafts, a closed bearing at one end of the casing for one of the shafts, an open bearing at the other end of the casing for the other shaft, a cap hinged to the open bearing for normally closing the same to prevent the accidental removal of the shaft and means for holding said cap closed.

In testimony whereof I have hereunto affixed my signature.

CHARLES DURNING.